US012695680B2

(12) United States Patent
Gad et al.

(10) Patent No.: US 12,695,680 B2
(45) Date of Patent: Jul. 28, 2026

(54) DYNAMIC SUBSCRIPTION KEY PERFORMANCE INDICATOR REPORTING IN AN OPEN RADIO ACCESS NETWORK

(71) Applicant: Dell Products L.P., Round Rock, TX (US)

(72) Inventors: Omar Wael Ahmed Gad, Cambridge (GB); Marwan Mansour, Alexandria (EG); Ahmed El Mahdawy, Cairo (EG); Karim Elkhafif, Cairo (EG)

(73) Assignee: Dell Products L.P., Round Rock, TX (US)

( * ) Notice: Subject to any disclaimer, the term of this patent is extended or adjusted under 35 U.S.C. 154(b) by 138 days.

(21) Appl. No.: 18/639,651

(22) Filed: Apr. 18, 2024

(65) Prior Publication Data

US 2025/0330394 A1 Oct. 23, 2025

(51) Int. Cl.
*G06F 15/173* (2006.01)
*H04L 41/0803* (2022.01)
*H04L 41/5009* (2022.01)

(52) U.S. Cl.
CPC ...... *H04L 41/5009* (2013.01); *H04L 41/0803* (2013.01)

(58) Field of Classification Search
CPC .................. H04L 41/5009; H04L 41/0803
See application file for complete search history.

(56) References Cited

U.S. PATENT DOCUMENTS

| | | | |
|---|---|---|---|
| 11,729,067 B2 * | 8/2023 | Chou ..................... | H04L 41/40 370/331 |
| 2017/0012841 A1 * | 1/2017 | Ketheesan .......... | H04L 41/0823 |
| 2022/0360513 A1 * | 11/2022 | Matham .................. | H04L 43/08 |
| 2023/0164759 A1 * | 5/2023 | Guchhait .............. | H04W 24/02 370/328 |
| 2024/0422077 A1 | 12/2024 | Gad et al. | |
| 2025/0267080 A1 * | 8/2025 | Dória .................. | H04L 41/5009 |

* cited by examiner

*Primary Examiner* — Duyen M Doan
(74) *Attorney, Agent, or Firm* — Amin, Turocy & Watson, LLP

(57) ABSTRACT

A system can comprise a near real-time radio access network intelligent controller that comprises an application, a service management and orchestration platform. The service management and orchestration platform can be configured to analyze respective loads on respective network nodes of a group of network nodes that is part of a radio access network, to produce an analysis. The service management and orchestration platform can be configured to determine, based on the analysis, a first key performance indicator that corresponds to a subscription by the application. The service management and orchestration platform can be configured to communicate the first key performance indicator to the application. The application can be configured to modify the subscription by subscribing to the first key performance indicator and unsubscribing from a second key performance indicator of the subscription.

20 Claims, 13 Drawing Sheets

100

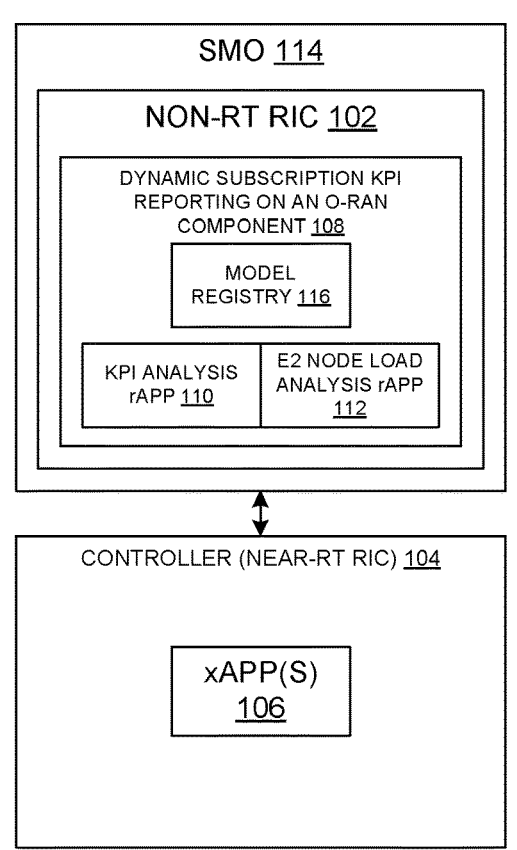
FIG. 1

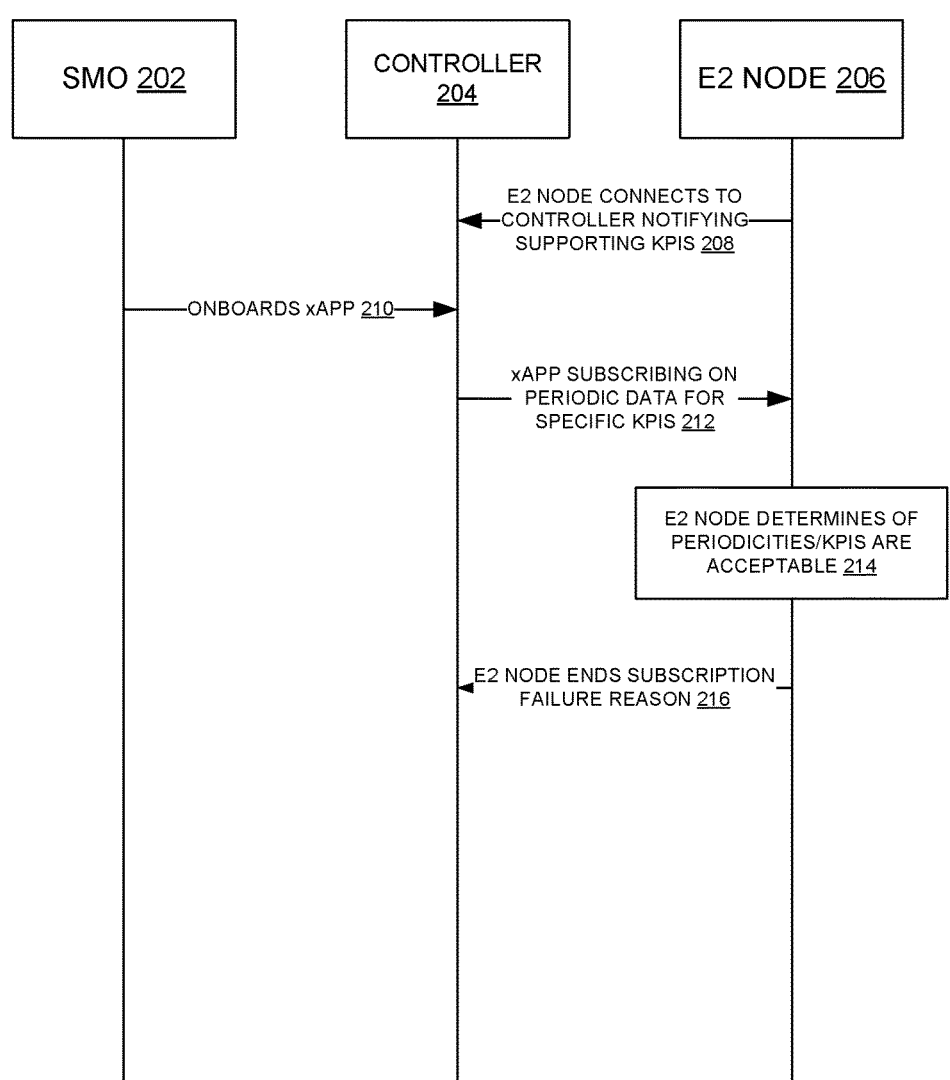
FIG. 2

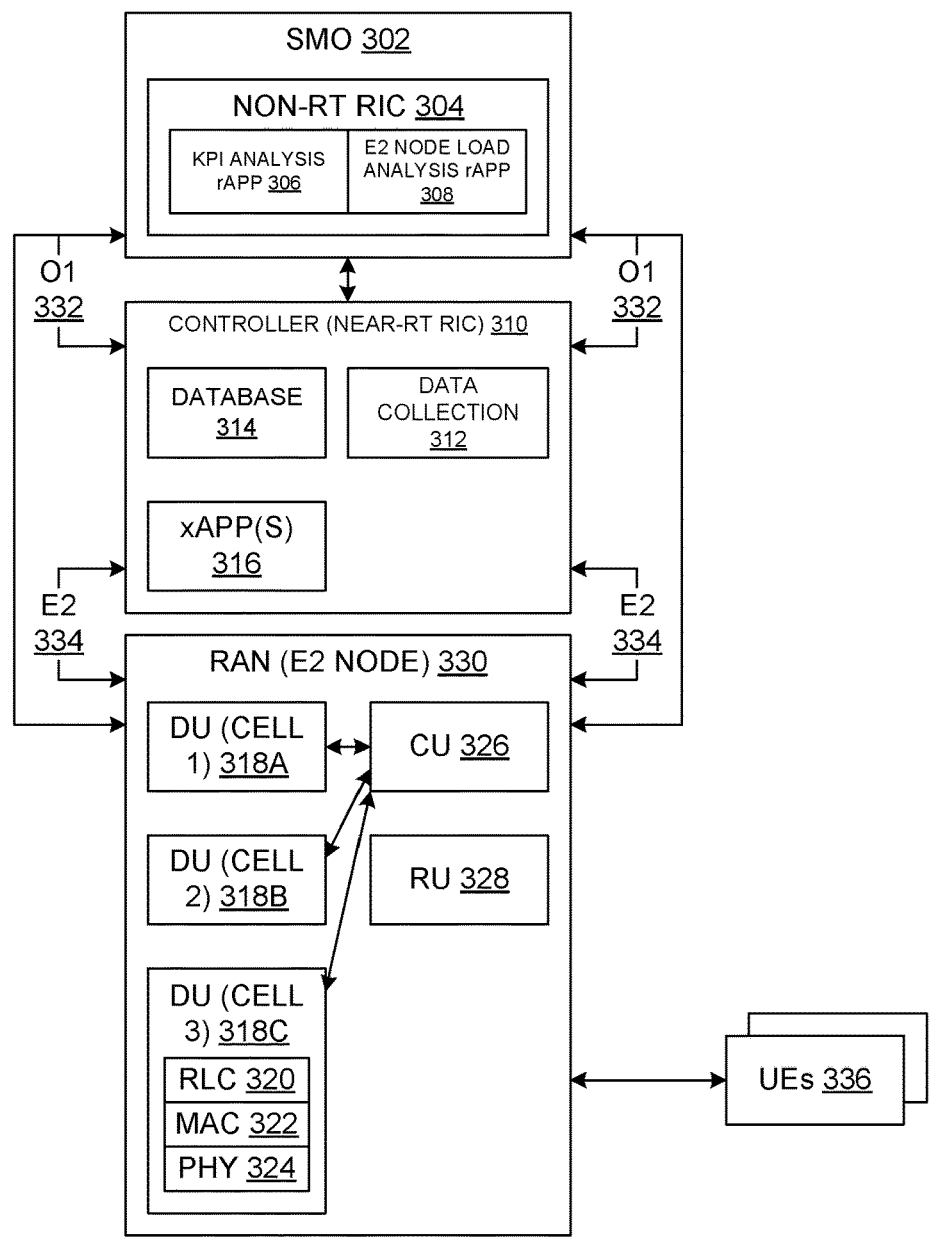
FIG. 3

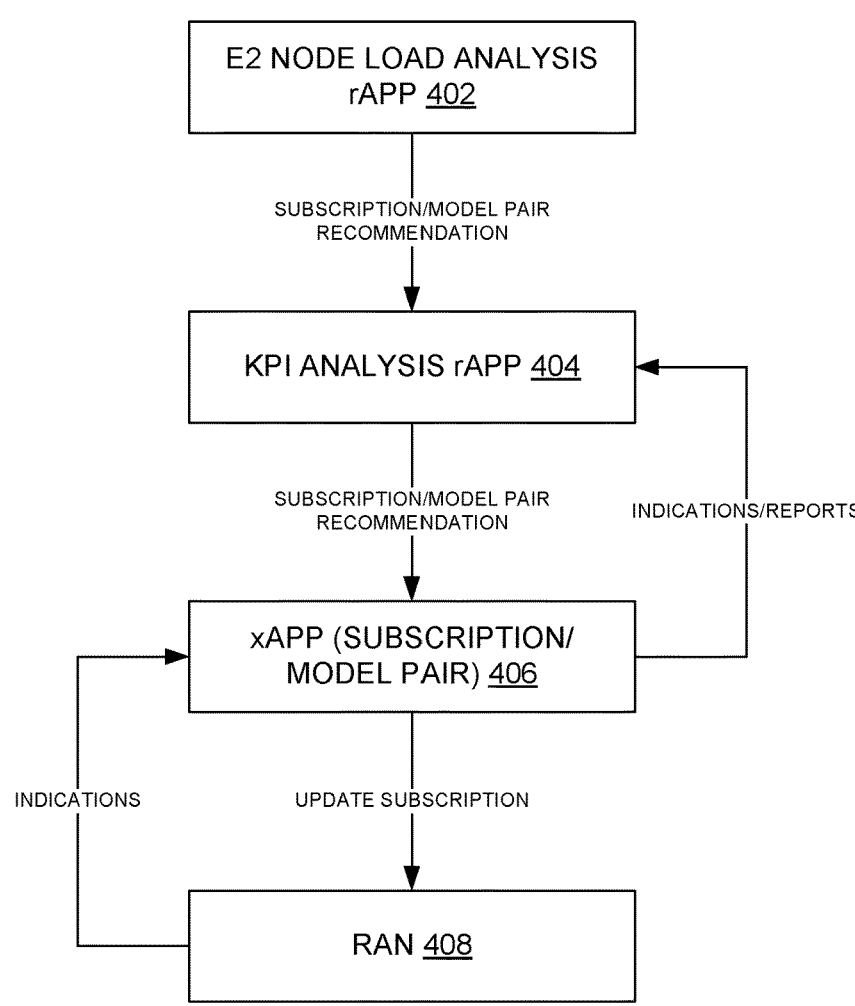
FIG. 4

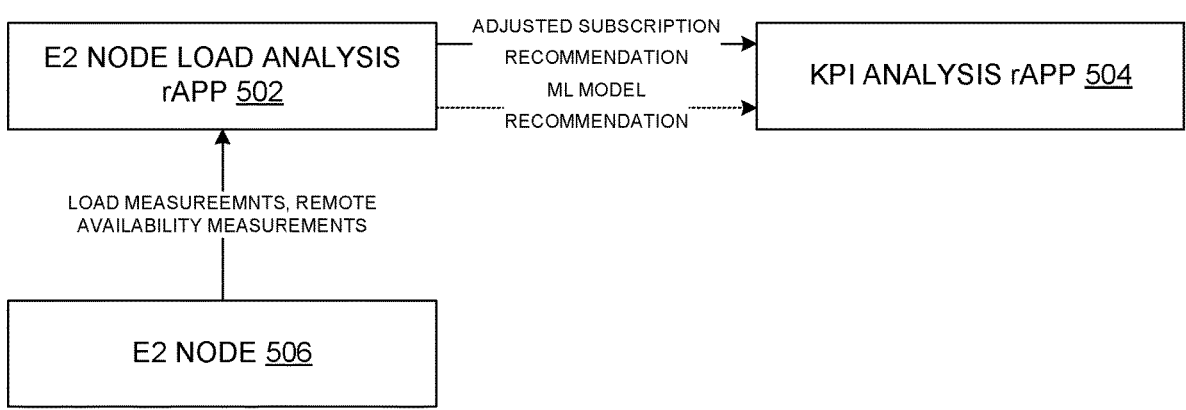
FIG. 5

600
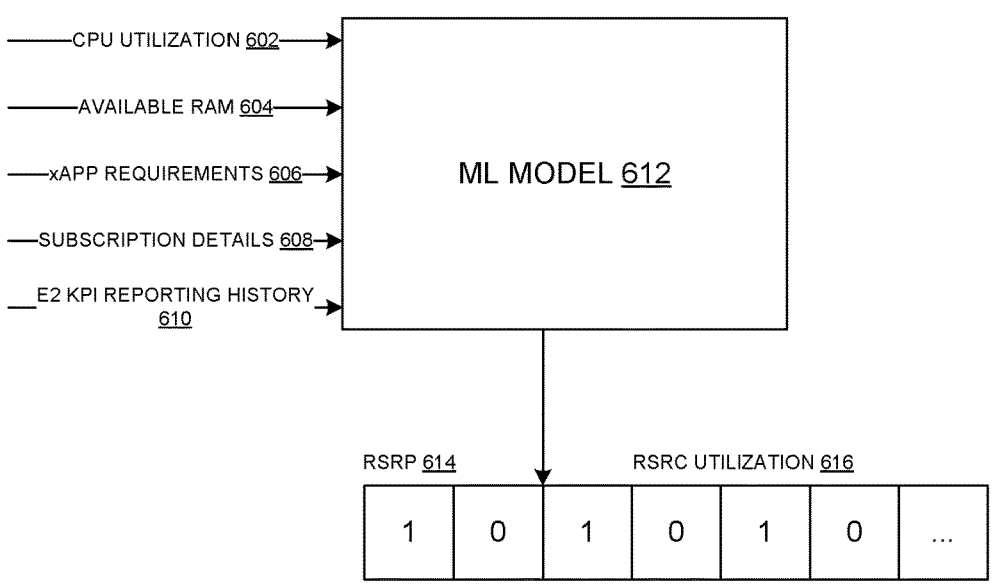
CPU UTILIZATION 602
AVAILABLE RAM 604
xAPP REQUIREMENTS 606
SUBSCRIPTION DETAILS 608
E2 KPI REPORTING HISTORY 610
ML MODEL 612
RSRP 614
RSRC UTILIZATION 616
| 1 | 0 | 1 | 0 | 1 | 0 | ... |
FIG. 6

700
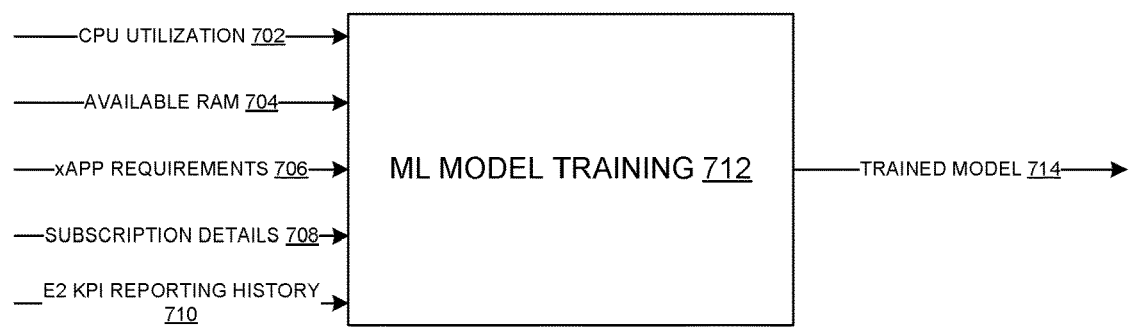
CPU UTILIZATION 702
AVAILABLE RAM 704
xAPP REQUIREMENTS 706
SUBSCRIPTION DETAILS 708
E2 KPI REPORTING HISTORY 710
ML MODEL TRAINING 712
TRAINED MODEL 714
FIG. 7

900
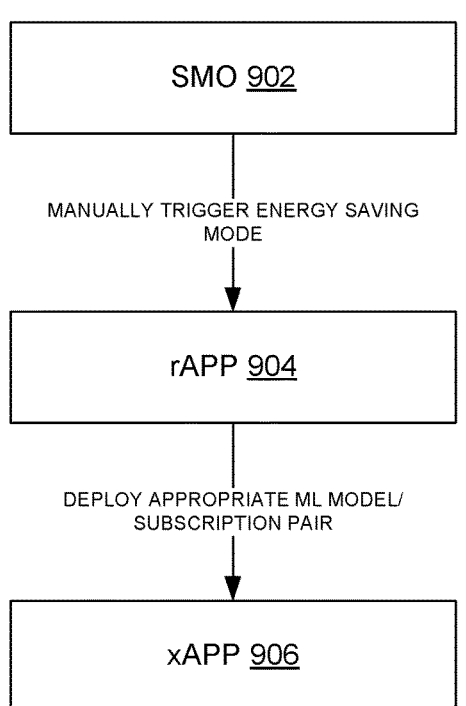
FIG. 9

1000

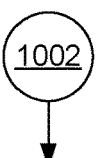

1002

ANALYZING, BY A SERVICE MANAGEMENT AND ORCHESTRATION PLATFORM, RESPECTIVE LOADS ON RESPECTIVE NETWORK NODES OF A GROUP OF NETWORK NODES THAT IS PART OF A RADIO ACCESS NETWORK, TO PRODUCE AN ANALYSIS 1004

DETERMINING, BY THE SERVICE MANAGEMENT AND ORCHESTRATION PLATFORM AND BASED ON THE ANALYSIS, A FIRST KEY PERFORMANCE INDICATOR THAT CORRESPONDS TO A SUBSCRIPTION BY THE APPLICATION 1006

COMMUNICATING, BY THE SERVICE MANAGEMENT AND ORCHESTRATION PLATFORM, THE FIRST KEY PERFORMANCE INDICATOR TO AN APPLICATION 1008

MODIFYING, BY THE APPLICATION, THE SUBSCRIPTION BY SUBSCRIBING TO THE FIRST KEY PERFORMANCE INDICATOR AND UNSUBSCRIBING FROM A SECOND KEY PERFORMANCE INDICATOR OF THE SUBSCRIPTION 1010

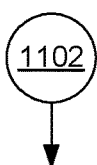

1102

ANALYZING, BY A SERVICE MANAGEMENT AND ORCHESTRATION PLATFORM, RESPECTIVE LOADS ON RESPECTIVE NETWORK NODES OF A GROUP OF NETWORK NODES OF A RADIO ACCESS NETWORK OF THE SYSTEM, TO PRODUCE AN ANALYSIS 1104

DETERMINING, BASED ON THE ANALYSIS AND BY THE SERVICE MANAGEMENT AND ORCHESTRATION PLATFORM, A KEY PERFORMANCE INDICATOR FOR USE BY AN APPLICATION THAT OPERATES IN A NEAR REAL-TIME RADIO ACCESS NETWORK INTELLIGENT CONTROLLER OF THE SYSTEM 1106

COMMUNICATING, BY THE SERVICE MANAGEMENT AND ORCHESTRATION PLATFORM, THE KEY PERFORMANCE INDICATOR TO THE APPLICATION, WHEREIN THE APPLICATION IS CONFIGURED TO SUBSCRIBE TO THE KEY PERFORMANCE INDICATOR 1108

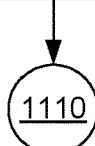

DYNAMIC SUBSCRIPTION KEY PERFORMANCE INDICATOR REPORTING IN AN OPEN RADIO ACCESS NETWORK

BACKGROUND

A radio access network (RAN) can comprise a type of broadband cellular communications network. An open radio access network (O-RAN) can comprise a system architecture for a RAN.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a near real-time radio access network intelligent controller that comprises an application, a service management and orchestration platform. The service management and orchestration platform can be configured to analyze respective loads on respective network nodes of a group of network nodes that is part of a radio access network, to produce an analysis. The service management and orchestration platform can be configured to determine, based on the analysis, a first key performance indicator that corresponds to a subscription by the application. The service management and orchestration platform can be configured to communicate the first key performance indicator to the application. The application can be configured to modify the subscription by subscribing to the first key performance indicator and unsubscribing from a second key performance indicator of the subscription.

An example method can comprise analyzing, by a service management and orchestration platform of a system that comprises at least one processor, respective loads on respective network nodes of a group of network nodes of a radio access network of the system, to produce an analysis. The method can further comprise determining, based on the analysis and by the service management and orchestration platform, a key performance indicator for use by an application that operates in a near real-time radio access network intelligent controller of the system. The method can further comprise communicating, by the service management and orchestration platform, the key performance indicator to the application, wherein the application is configured to subscribe to the key performance indicator.

An example non-transitory computer-readable medium can comprise instructions that, in response to execution, cause a system comprising a processor to perform operations. These operations can comprise analyzing respective loads on respective network nodes of a group of network nodes of a radio access network, to produce an analysis. These operations can further comprise determining, based on the analysis, a key performance indicator. These operations can further comprise communicating the key performance indicator to an application that is configured to subscribe to the key performance indicator.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate dynamic key performance indicator (KPI) reporting in an open radio access network (O-RAN), in accordance with an embodiment of this disclosure;

FIG. 2 illustrates an example signal flow that can facilitate dynamic KPI reporting in an O-RAN, in accordance with an embodiment of this disclosure;

FIG. 3 illustrates another example system architecture that can facilitate dynamic KPI reporting in an O-RAN, in accordance with an embodiment of this disclosure;

FIG. 4 illustrates another example system architecture that can facilitate dynamic KPI reporting in an O-RAN, in accordance with an embodiment of this disclosure;

FIG. 5 illustrates another example system architecture that can facilitate dynamic KPI reporting in an O-RAN, in accordance with an embodiment of this disclosure;

FIG. 6 illustrates another example system architecture that can facilitate dynamic KPI reporting in an O-RAN, in accordance with an embodiment of this disclosure;

FIG. 7 illustrates another example system architecture that can facilitate dynamic KPI reporting in an O-RAN, in accordance with an embodiment of this disclosure;

FIG. 9 illustrates another example system architecture that can facilitate dynamic KPI reporting in an O-RAN, in accordance with an embodiment of this disclosure;

FIG. 10 illustrates an example process flow that can facilitate dynamic KPI reporting in an O-RAN, in accordance with an embodiment of this disclosure;

FIG. 11 illustrates another example process flow that can facilitate dynamic KPI reporting in an O-RAN, in accordance with an embodiment of this disclosure;

DETAILED DESCRIPTION

Overview

Figure 8:
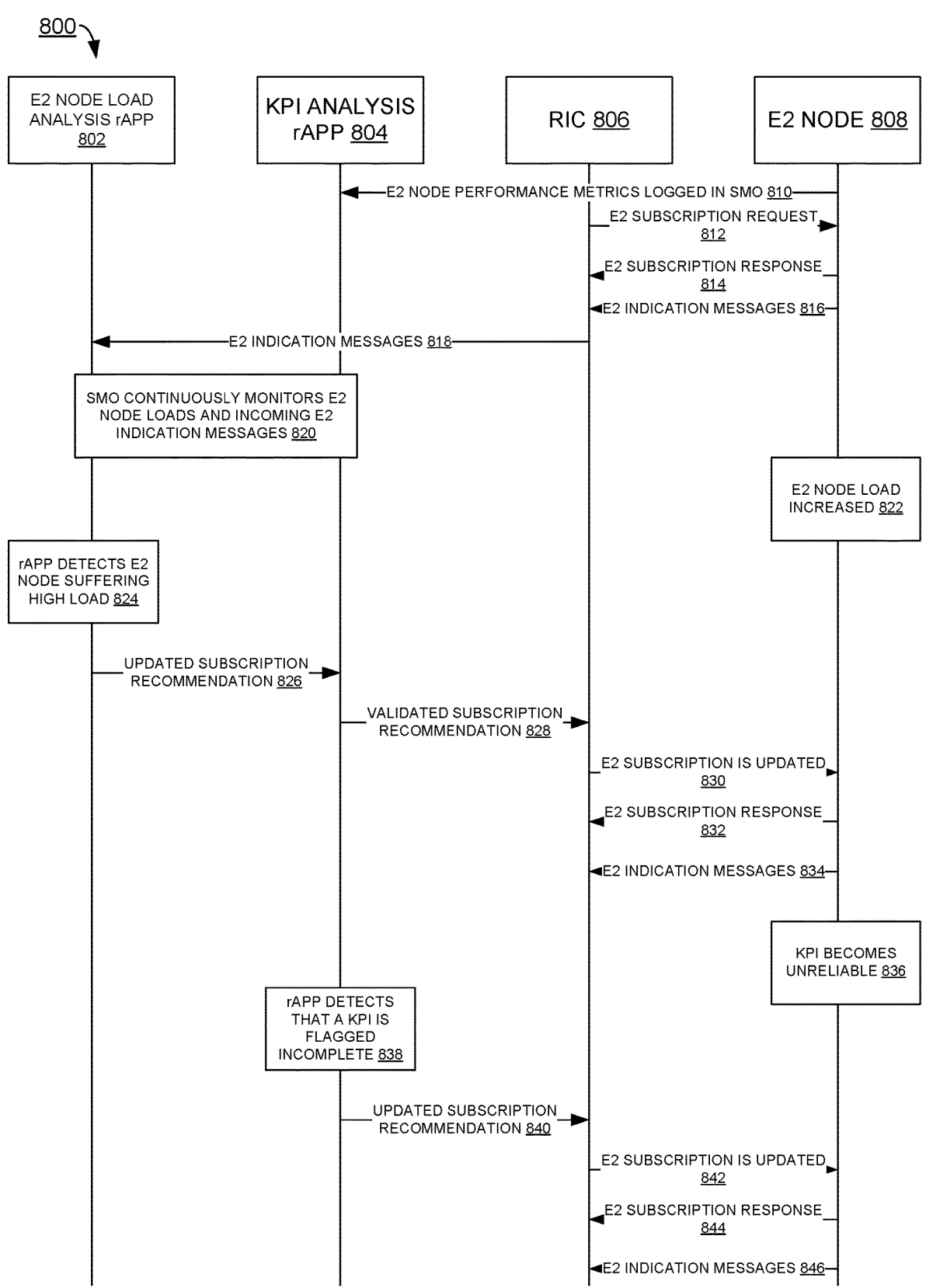
FIG. 8 illustrates another example system architecture that can facilitate dynamic KPI reporting in an O-RAN, in accordance with an embodiment of this disclosure.

The present examples generally relate to broadband cellular communications, particularly fifth-generation (5G) networks. It can be appreciated that the present techniques can be applied to other types of cellular networks. An Open Radio Access Network (O-RAN) can comprise an implementation of a cellular network. An O-RAN can comprise a disaggregated network where different vendors are used to supply components such as a radio unit (RU), a distributed unit (DU), and a centralized unit (CU).

An O-RAN can comprise an E2 interface, which can comprise an open interface between two end points, such as a near-real time RAN intelligent controller (near-RT RIC) and E2 nodes (e.g., DUs, CUs, and e-NodeBs (eNBs)). An E2 interface can facilitate a RIC in controlling procedures and functionalities of E2 nodes.

In an O-RAN, rApps can comprise specialized microservices operating on a non-RT RIC. Then extended applications (xApps) can be hosted on a near-RT RIC, and optimize radio spectrum efficiency.

E2 nodes can be prone to periods of fluctuating traffic, which can affect their capabilities to frequently report certain data. It can be that xApps are not aware of these limitations on the E2 node side, and are unable to accommodate the fluctuations that may occur, and missing key performance indicators (KPIs) coming from the E2 nodes.

The present techniques can be implemented to solve these problems by facilitating a machine learning (ML)-based rApp to predict which ML model/subscription pair to utilize. A rApp can analyze E2 node KPIs to detect missing KPIs. The present techniques can also be implemented to facilitate an application programming interface (API) between a non-real time (RT) RAN intelligent controller (RIC) and a near-RT RCIC to manage xApp subscriptions/ML model deployments.

Advantages of the present techniques can include a recommended ML model/subscription pair being dynamically updated according to load, utilization, etc.; optimized quality-of-service (QOS) by identifying a KPI/model pair for a given use case; optimized energy efficiency by identifying a KPI/model pair for resource utilization; and migration of KPIs missing in reports affecting deployed model inputs by recommending a new subscription/model pair.

Parts of an O-RAN cellular communications network that can be impacted by implementing the present techniques can include a RIC, service management and orchestration (SMO), and E2 nodes as RAN nodes.

Example Architectures, Etc.

FIG. 1 illustrates an example system architecture 100 that can facilitate dynamic KPI reporting in an O-RAN, in accordance with an embodiment of this disclosure.

System architecture 100 comprises non real-time RIC 102, controller (near-real time RIC) 104, xApp(s) 106, dynamic subscription KPI reporting on an O-RAN component 108, KPI analysis rApp 110, E2 node load analysis rApp 112, SMO 114, and model registry 116.

System architecture 100 presents one logical example of implementing the present techniques, and it can be appreciated that there can be other example architectures.

Figure 13:
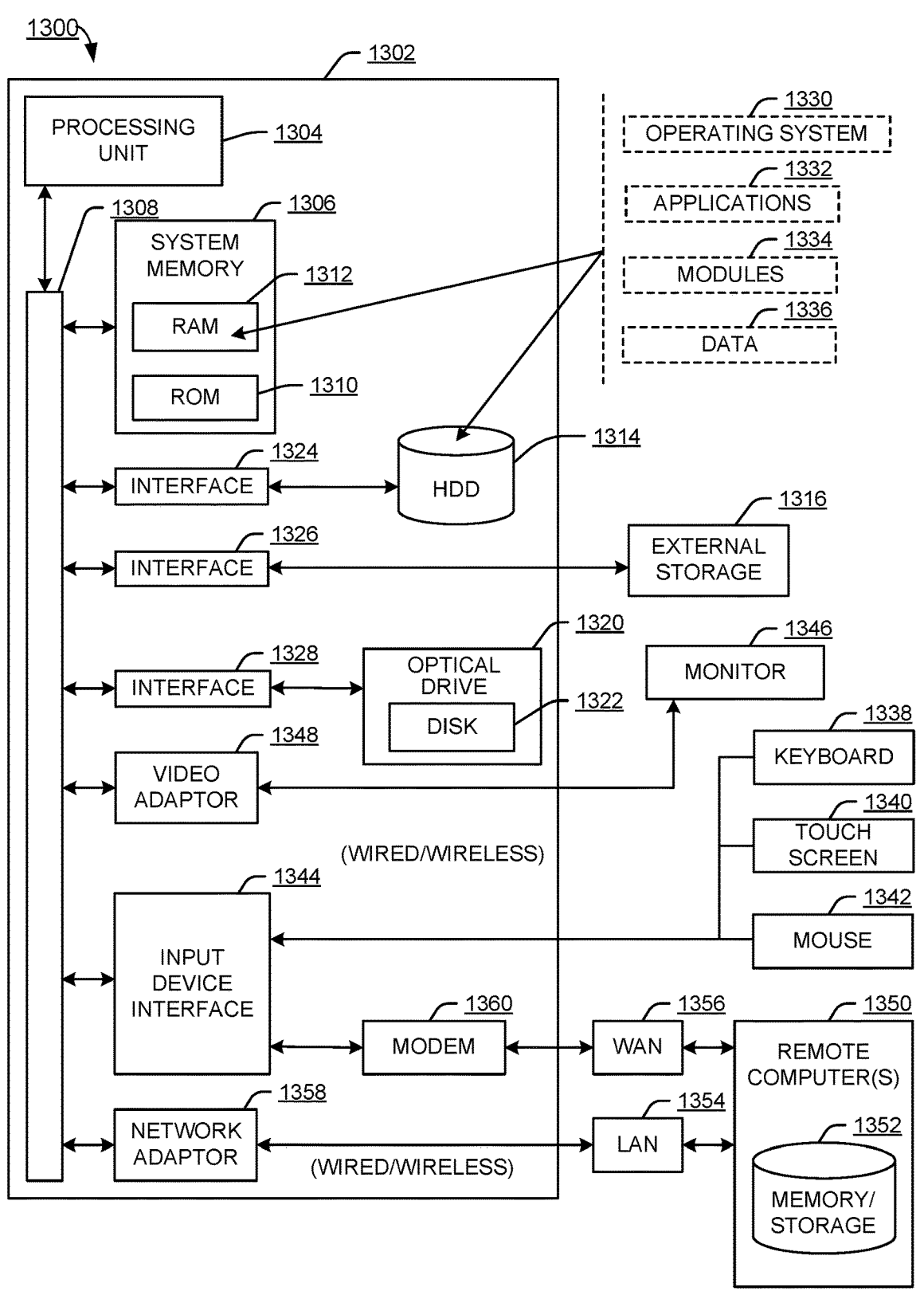
FIG. 13 illustrates an example block diagram of a computer operable to execute an embodiment of this disclosure.

Each of controller (near-real time RIC) 104 and/or SMO 114 can be implemented with part(s) of computing environment 1300 of FIG. 13. Communications network 104 can comprise a computer communications network, such as the Internet, or an intranet.

In some examples, dynamic KPI reporting in an O-RAN component 108 can facilitate dynamic KPI reporting via a KPI analysis rApp and/or a E2 node load analysis rApp, as described herein.

Figure 12:
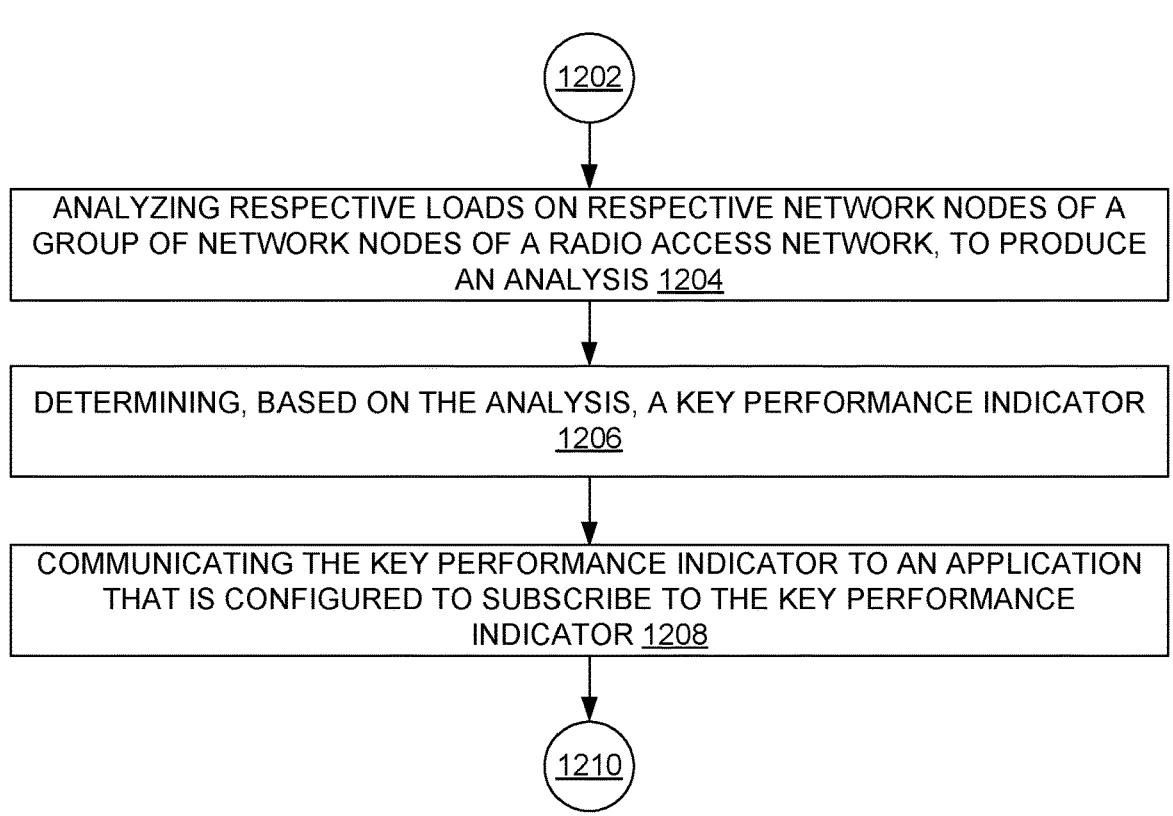
FIG. 12 illustrates another example process flow that can facilitate dynamic KPI reporting in an O-RAN, in accordance with an embodiment of this disclosure.

In some examples, dynamic KPI reporting in an O-RAN component 108 can implement part(s) of process flows of FIGS. 10-12 to implement dynamic KPI reporting in an O-RAN.

It can be appreciated that system architecture 100 is one example system architecture for dynamic KPI reporting in an O-RAN, and that there can be other system architectures that facilitate dynamic KPI reporting in an O-RAN.

FIG. 2 illustrates an example signal flow 200 that can facilitate dynamic KPI reporting in an O-RAN, in accordance with an embodiment of this disclosure. In some examples, part(s) of signal flow 200 can be used by part(s) of system architecture 100 of FIG. 1.

Signal flow 200 comprises SMO 202, controller 204, E2 node 206, E2 node connects to controller notifying supporting KPIs 208, onboards xApp 210, xApp subscribing on periodic data for specific KPIs 212, E2 node determines of periodicities/KPIs are acceptable 214, E2 node ends subscription failure reason 216, and dynamic subscription KPI reporting on an O-RAN network component 218 (which can be similar to dynamic subscription KPI reporting on an O-RAN component 108 of FIG. 1).

FIG. 2 illustrates an example scenario where a subscription on a specific KPI fails due to an E2 node being unable to honor a reporting request coming from the controller side. Prior approaches can dynamically adjust KPI reporting periodicity. However, it can be that these prior approaches do not account for a scenario where a whole KPI becomes unavailable for reporting or is too costly.

It can be that prior approaches to xApps cannot dynamically change their subscriptions, as they have static ML models that support a set number of KPIs, which can result in either degraded performance in an E2 node, or cancellation of a subscription due to a lack of inputs for an xApp ML model.

FIG. 3 illustrates another example system architecture 300 that can facilitate dynamic KPI reporting in an O-RAN, in accordance with an embodiment of this disclosure. In some examples, part(s) of system architecture 300 can be used by part(s) of system architecture 100 of FIG. 1.

System architecture 300 comprises SMO 302, non-RT RIC 304, KPI analysis rApp 306, E2 node load analysis rApp 308, controller (near-RT RIC) 310, data collection 312, database 314, xApp(s) 316, DU (cell 1) 318A, DU (cell 2) 318B, DU (cell 3) 318C, radio link control (RLC) 320, medium access control (MAC) 322, physical (PHY) 324, CU 326, RU 328, RAN (E2 node) 330, O1 332, E2 334, and user equipments (UEs) 336.

A system architecture in which the present techniques are implemented can be as follows. A SMO can act as a management and orchestration layer that controls configuration and automation aspects of RIC and RAN elements. The SMO can onboard xApps and rApps onto the RIC components.

A non-RT RAN RIC (nRT RIC) can comprise an E2 node load analysis rApp and a KPI analysis rApp. The E2 node load analysis rApp can analyze central processing unit (CPU) utilization and radio access memory (RAM) data from E2 nodes. Based on this analysis, the E2 node load analysis rApp can recommend which model/subscription pair is suitable for current utilizations.

A KPI analysis rApp can analyze indication data reported by the nRT RIC to detect missing KPIs. Based on this analysis, the KPI analysis rApp can recommend which model/subscription pair is suitable for the current available KPIs.

A near-RT RAN RIC can comprise an xApp and a database. This xApp can subscribe on E2 KPIs, and utilize a recommended model/subscription pair from the nRT RIC. The database can store KPIs collected from E2 nodes, as well as store subscription details (e.g., requested KPIs, accepted/failed requests).

A non-RT ML model/subscription KPIs recommendation can be implemented as follows. The present techniques can be implemented to intelligently recommend adjusting subscriptions (e.g., requested KPIs) to be used by rApps and xApps. This can be powered by an ML model that dynamically adapts its recommendations according to a current load on RAN components (e.g., E2 nodes). Additionally, the present techniques can be implemented to facilitate adjusting subscriptions where E2 nodes fail to report specific KPIs. Therefore, a load of RAN components can be reduced by decreasing a number of KPIs requested, thus reducing a risk of a refused subscription, blocking xApps flow, and overall RAN degradation.

In some examples, the following components can be utilized in implementing the present techniques. An E2 node load analysis rApp can analyze load on RAN components using CPU utilization, available RAM, and other usage details to determine/detect highly-loaded periods. Based on historical data, the E2 node load analysis rApp can recommend an alternate set of input features to subscribe to, together with a recommended ML model trained on those input features (where applicable).

A KPI analysis rApp can analyze E2 indications to detect missing or corrupt KPIs. Based on the available KPIs, the KPI analysis rApp can recommend an alternate set of input features to subscribe to, together with a ML model trained on those input features (where applicable).

The present techniques can be implemented to dynamically adapt subscriptions and models used in a RIC to optimize RAN resources. The present techniques can also be implemented to mitigate KPIs missing in reports affecting deployed model inputs by recommending a new subscription/model pair.

With implementing the present techniques, reporting a smaller number of KPIs can allow an E2 node to utilize its resources more effectively in managing UE traffic loads. An E2 node can be able to dynamically change KPIs in active subscriptions as resource utilization load fluctuates. A SMO can control energy saving potential when reported KPIs are fewer. There can be a mitigation of KPIs missing in reports affecting the deployed model inputs by recommending a new subscription/model pair.

FIG. 4 illustrates another example system architecture 400 that can facilitate dynamic KPI reporting in an O-RAN, in accordance with an embodiment of this disclosure. In some examples, part(s) of system architecture 400 can be used by part(s) of system architecture 100 of FIG. 1.

System architecture 400 comprises E2 node load analysis rApp 402, KPI analysis rApp 404, xApp (subscription/model pair) 406, and RAN 408

An E2 node load analysis rApp can be responsible for monitoring a load on existing E2 nodes, and accordingly, recommending an adjusted subscription to decrease load on the E2 nodes in peak hours. The E2 node load analysis rApp can adjust active subscriptions for xApps when existing E2 nodes are suffering from high load. Using ML, it can learn a relationship between available resources on a given node and its ability to serve a given subscription.

For ML-powered applications, the rApp can utilize a pool of pretrained models performing the same task using a different number of input features, recommending the suitable model for the adjusted subscription.

In some examples, the pool of models is provided by the operator through the SMO. In examples where there are no available alternative models, it can be that only the subscriptions are adjusted.

The rApp can employ a ML model of its own to recommend how to adjust the subscription for a given xApp. Further description of the ML model type, its inputs and its outputs, is below. Based on the ML model output, the E2 node load analysis rApp can send the recommendation to the KPI analysis rApp for a next stage of a pipeline, as described below with respect to the KPI analysis component.

FIG. 5 illustrates another example system architecture 500 that can facilitate dynamic KPI reporting in an O-RAN, in accordance with an embodiment of this disclosure. In some examples, part(s) of system architecture 500 can be used by part(s) of system architecture 100 of FIG. 1.

System architecture 500 comprises E2 node load analysis rApp 502, KPI analysis rApp 504, and E2 node 506.

A ML model for am E2 node load analysis rApp can be implemented as follows. A ML model used in an E2 node load analysis rApp can be a multi-input multi-output classification model, recommending an adjusted set of KPIs for each subscription utilized by a given xApp.

The inputs to the ML model can include E2 node Resource data such as CPU Utilization on E2 nodes, available RAM on E2 nodes, xApp requirements (requested KPIs), historical subscription data (accepted and revised subscription requests).

As an output, and in some examples, the ML model can predict an ability of the E2 node to report every KPI known in the supported service models. The ability of the E2 node can be determined from historical subscriptions revised by the E2 node when they included a given KPI. This can suggest that such KPIs require computation power or other resources from the E2 node.

Based on the given predictions, a subscribing application (xApp) that requests a KPI that is predicted to not be available can receive an adjusted subscription recommendation.

In some examples, for ML-powered applications, the corresponding ML model using the KPIs in the recommended subscription can be given to the xApp.

FIG. 6 illustrates another example system architecture 600 that can facilitate dynamic KPI reporting in an O-RAN, in accordance with an embodiment of this disclosure. In some examples, part(s) of system architecture 600 can be used by part(s) of system architecture 100 of FIG. 1.

System architecture 600 comprises CPU utilization 602, available RAM 604, xApp requirements 606, subscription details 608, E2 KPI reporting history 610, ML model 612, reference signal received power (RSRP) 614, and RSRC utilization 616.

Model training for an E2 node load analysis rApp can be implemented as follows. Model training can utilize data collected from E2 nodes and subscribing xApps. This data can include CPU utilization on E2 nodes; available RAM on E2 nodes; xApp requirements (requested KPIs); and historical subscription data (accepted and revised subscription requests)

The model training can take place on a non-RT RIC in a dedicated rApp. This can utilize data collected by a host SMO. In some examples, the training can be done offline on data collected from multiple networks and then deployed onto a rApp for prediction.

FIG. 7 illustrates another example system architecture 700 that can facilitate dynamic KPI reporting in an O-RAN, in accordance with an embodiment of this disclosure. In some examples, part(s) of system architecture 700 can be used by part(s) of system architecture 100 of FIG. 1.

System architecture 700 comprises CPU utilization 702, available RAM 704, xApp requirements 706, subscription details 708, E2 KPI reporting history 710, ML model training 712, and trained model 714.

A KPI analysis rApp can be implemented as follows. The KPI analysis rApp can be responsible for monitoring the incoming E2 Indication messages sent by the E2 node to the xApp which are then forwarded to the SMO.

The E2 node load can recommend adjusted subscriptions to decrease E2 node load. Some cases can include the E2 node accepting the subscription while still failing to report the required KPI(s). The KPI analysis rApp can cover the gap where there may be some missing KPIs that are not caused by the highly loaded RAN resources.

In E2 indication messages, an incomplete flag can be set by the E2 node on a KPI to indicate that this measurement is unreliable. The rApp can maintain a history of the completeness of incoming KPIs from each E2 node. The duration that this history is maintained for can be configurable.

The KPI analysis rApp can receive the recommended subscription from the E2 node load analysis rApp and validates it. Where it finds that a subset of the suggested KPIs is found to be incomplete by the E2 node, the recommendation can be adjusted to exclude these KPIs.

The updated recommendation (as well as a suitable ML mode, in some examples) can be sent to the xApp after validation. The rApp will continue to monitor incoming E2 indication messages for validation. Where it finds that more KPIs become incomplete, the validation process can be repeated, and possibly update the current recommended subscription.

Detecting missing KPIs with the KPI analysis rApp can be implemented as follows. The rApp can receive a log of indications, which can have been previously stored by the subscribing application (xApp). O-RAN E2 messages (e.g., E2 service model (E2SM) key performance measurement (KPM) E2SM) can follow a specific format and structure, in which a specific value named INCOMPLETE can be present to indicate the unreliability of a given KPI requested by the subscribing application.

The KPI analysis rApp can parse the E2 indication messages to detect requested KPIs with an INCOMPLETE flag. Following the detection, the rApp can update its KPI State table to reflect the missing KPI. Based on the detection, the KPI analysis rApp can retrieve a recommended alternative ML model that utilizes a set of input features available for collection as per the parsed E2 messages (where applicable).

Example uses case of the present techniques can include the following. FIG. 7 illustrates how load monitoring and KPI analysis can work to optimize an xApp's E2 subscriptions.

A SMO can receive and log performance metrics from E2 nodes. An E2 node load analysis rApp receives system performance metrics (e.g., CPU and memory utilization) from E2 nodes. The KPI analysis rApp can receive E2 indication messages that contain an incomplete flag set by the E2 node indicating that the measurement is unreliable.

Initially, xApps deployed on the RIC can send a default E2 subscription with all supported KPIs. The SMO can monitor E2 node loads and E2 indication completeness in the background.

Should the load on the E2 node increase, the ML model in the SMO can detect the increase in load, and the E2 node load analysis rApp can suggest a reduced number of KPIs for the xApp, and an applicable model from the model registry.

The KPI analysis rApp can validate the new recommendation to ensure all suggested KPIs are satisfied by the E2 node (e.g., incomplete flag is not set), and then forward it to the xApp. The new model can be deployed on the RIC, and the xApp will send an updated E2 Subscription request with the now reduced number of KPIs.

FIG. 8 illustrates another example system architecture 800 that can facilitate dynamic KPI reporting in an O-RAN, in accordance with an embodiment of this disclosure. In some examples, part(s) of system architecture 800 can be used by part(s) of system architecture 100 of FIG. 1.

System architecture 800 comprises E2 node load analysis rApp 802, KPI analysis rApp 804, RIC 806, E2 node 808, E2 node performance metrics logged in SMO 810, E2 subscription request 812, E2 subscription response 814, E2 indication messages 816, E2 indication messages 818, SMO continuously monitors E2 node loads and incoming E2 indication messages 820, E2 node load increased 822, rApp detects E2 node suffering high load 824, updated subscription recommendation 826, validated subscription recommendation 828, E2 subscription is updated 830, E2 subscription response 832, E2 indication messages 834, KPI becomes unreliable 836, rApp detects that a KPI is flagged incomplete 838, updated subscription recommendation 840, E2 subscription is updated 842, E2 subscription response 844, and E2 indication messages 846.

Should a KPI reported by the E2 node become unreliable, the KPI analysis rApp can detect that the incomplete flag is now set, and adjust the subscription recommendation to remove this KPI. The KPI analysis rApp can send the updated recommendation and a suitable ML model to the xApp. The new model can be deployed on the RIC, and the xApp can send an updated E2 Subscription request with the now reduced number of KPIs.

There can be other use cases of the present techniques. This dynamic subscription can be triggered manually by the SMO. If a policy is set for energy saving within a RIC, this can trigger the deployment of a ML model/subscription KPI pair that can use the least KPIs in order to reduce load.

FIG. 9 illustrates another example system architecture 900 that can facilitate dynamic KPI reporting in an O-RAN, in accordance with an embodiment of this disclosure. In some examples, part(s) of system architecture 900 can be used by part(s) of system architecture 100 of FIG. 1.

System architecture 900 comprises SMO 902, rApp 904, and xApp 906.

Example Process Flows

FIG. 10 illustrates an example process flow 1000 that can facilitate dynamic KPI reporting in an O-RAN, in accordance with an embodiment of this disclosure. In some examples, one or more embodiments of process flow 1000 can be implemented by dynamic KPI reporting in an O-RAN component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 1100 of FIG. 11, and/or process flow 1200 of FIG. 12.

In some examples, process flow 1000 can be implemented in a system that comprises a near real-time radio access network intelligent controller that comprises an application, and a service management and orchestration platform. These components can be similar to controller (near real-time RIC) 104, xApp(s) 106, and SMO 114, respectively, of FIG. 1.

In some examples, the application comprises an extensible application (xApp).

In some examples, a system that implements process flow 1000 can comprise a database used for storage by the near real-time radio access network intelligent controller, where the database is configured to store key performance indicators that are collected from the group of network nodes. That is, there can be a database that stores KPIs collected from E2 nodes.

In some examples, a system that implements process flow 1000 can comprise a database used for storage by the near real-time radio access network intelligent controller, where the database is configured to store subscription details from the application, and where the subscription details comprise a first indication of a requested key performance indicator, and a second indication of whether a request for the requested key performance indicator was accepted or failed. That is, there can be a database that stores subscription details (e.g., requested KPIs, and/or accepted/failed requests).

Process flow 1000 begins with 1002, and moves to operation 1004.

Operation 1004 depicts analyzing, by a service management and orchestration platform, respective loads on respective network nodes of a group of network nodes that is part of a radio access network, to produce an analysis. That is, using the example of FIG. 1, SMO 114 can comprise E2 node load analysis rApp 102.

In some examples, the respective network nodes of the group of network nodes comprise E2 nodes.

In some examples, the service management and orchestration platform is configured to manage configuration and automation of elements of the radio access network and a radio access network intelligent controller of the system. That is, the SMO can act as a management and orchestration layer that controls configuration and automation aspects of RIC and RAN elements.

In some examples, the application is an extended application, and the service management and orchestration platform is configured to onboard a radio access network application or the extended application onto radio access network intelligent controller components of the system. That is, an SMO can onboard xApps and rApps onto RIC components.

After operation 1004, process flow 1000 moves to operation 1006.

Operation 1006 depicts determining, by the service management and orchestration platform and based on the analysis, a first key performance indicator that corresponds to a subscription by the application. That is, an SMO can determine a KPI for an xApp.

After operation 1006, process flow 1000 moves to operation 1008.

Operation 1008 depicts communicating, by the service management and orchestration platform, the first key performance indicator to an application. That is, a SMO can recommend the KPI to an xApp.

In some examples, the service management and orchestration platform comprises a radio access network application that operates in a non real-time radio access network intelligent controller, and the radio access network application is configured to perform the analyzing, the determining, and the communicating. The radio access network application can be similar to E2 node load analysis rApp 102 of FIG. 1.

In some examples the service management and orchestration platform comprises a radio access network application that operates in a non real-time radio access network intelligent controller, and the radio access network application is configured to perform the analyzing of the indication data, the determining of the second group of key performance indicators, and the communicating of the second group of key performance indicators. That is, using the example of FIG. 1, it can be KPI analysis rApp 110 within SMO 114 that performs this function.

In some examples, the service management and orchestration platform comprises a first radio access network application that operates in a non real-time radio access network intelligent controller, the first radio access network application is configured to perform the analyzing of the respective loads, and the determining of the first group of key performance indicators, and the service management and orchestration platform comprises a second radio access network application that operates in the non real-time radio access network intelligent controller, and the second radio access network application is configured to perform the analyzing of the indication data, the determining of the second group of key performance indicators, and the communicating of the second group of key performance indicators. Using the example of FIG. 1 this can be that KPI analysis rApp 110 and E2 node load analysis rApp 112 are separate rApps.

In some examples, the analysis is a first analysis, the first key performance indicator is a first group of key performance indicators. In such examples, the service management and orchestration platform can be configured to analyze indication data reported by the near real-time radio access network intelligent controller, to produce a second analysis that identifies a missing key performance indicator. The service management and orchestration platform can be configured to determine, based on the second analysis, to remove the missing key performance indicator from the first group of key performance indicators, to produce a second group of key performance indicators. And, communicating the first key performance indicator to the application can comprise the service management and orchestration platform communicating the second group of key performance indicators to the application.

That is, a KPI analysis rApp can analyze indication data reported by a NRT RIC to detect missing KPIs. Based on this analysis, the KPI analysis rApp can recommend which model/subscription pair are suitable for the current available KPIs.

After operation 1008, process flow 1000 moves to operation 1010.

Operation 1010 depicts modifying, by the application, the subscription by subscribing to the first key performance indicator and unsubscribing from a second key performance indicator of the subscription. That is, the xApp can subscribe to the KPI.

After operation 1010, process flow 1000 moves to 1012, where process flow 1000 ends.

FIG. 11 illustrates an example process flow 1100 that can facilitate dynamic KPI reporting in an O-RAN, in accordance with an embodiment of this disclosure. In some examples, one or more embodiments of process flow 1100 can be implemented by dynamic KPI reporting in an O-RAN component 118 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1200 of FIG. 12.

Process flow 1100 begins with 1102, and moves to operation 1104.

Operation 1104 depicts analyzing, by a service management and orchestration platform, respective loads on respective network nodes of a group of network nodes of a radio access network of the system, to produce an analysis.

In some examples, the respective loads on the respective network nodes comprise respective loads of processing resources, or respective loads of memory resources. That is, what is analyzed for E2 nodes can be their CPU/memory loads.

In some examples, operation 1104 comprises performing, by the service management and orchestration platform, iterations of the analyzing. In some examples, the analyzing is performed with a machine learning model that operates on the service management and orchestration platform. That is there can be an ML model that dynamically adapts its recommendations according to a current load on the RAN components (e.g., E2 nodes).

After operation 1104, process flow 1100 moves to operation 1106.

Operation 1106 depicts determining, based on the analysis and by the service management and orchestration platform, a key performance indicator for use by an application that operates in a near real-time radio access network intelligent controller of the system.

After operation 1106, process flow 1100 moves to operation 1108.

Operation 1108 depicts communicating, by the service management and orchestration platform, the key performance indicator to the application, wherein the application is configured to subscribe to the key performance indicator.

In some examples, the key performance indicator is a first key performance indicator, and operation 1108 comprises, based on determining that a network node of the group of network nodes has failed to report the first key performance indicator, identifying, by the service management and orchestration platform, a second key performance indicator, and communicating, by the service management and orchestration platform, the second key performance indicator to the application, wherein the application is configured to adjust a subscription from the first key performance indicator to the second key performance indicator. In some examples, the adjusting of the subscription from the first key performance indicator to the second key performance indicator reduces a total number of subscribed-to key performance indicators of the system.

That is, techniques can be implemented to adjust subscriptions where E2 nodes fail to report specific KPIs. A RAN component's load can be reduced by decreasing the number of KPIs requested, thus reducing the risk of refused subscriptions, blocking xApps flow, and overall RAN degradation.

After operation 1108, process flow 1100 moves to 1110, where process flow 1100 ends.

FIG. 12 illustrates an example process flow 1200 that can facilitate dynamic KPI reporting in an O-RAN, in accordance with an embodiment of this disclosure. In some examples, one or more embodiments of process flow 1200 can be implemented by dynamic KPI reporting in an O-RAN component 128 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1100 of FIG. 11, and/or process flow 1200 of FIG. 12.

Process flow 1200 begins with 1202, and moves to operation 1204.

Operation 1204 depicts analyzing respective loads on respective network nodes of a group of network nodes of a radio access network, to produce an analysis.

After operation 1204, process flow 1200 moves to operation 1206.

Operation 1206 depicts determining, based on the analysis, a key performance indicator.

After operation 1206, process flow 1200 moves to operation 1208.

Operation 1208 depicts communicating the key performance indicator to an application that is configured to subscribe to the key performance indicator.

In some examples, operation 1208 comprises determining, based on the analysis, and a machine learning model that is trained on the key performance indicator, and communicating the machine learning model to the application, wherein the application is configured to utilize the machine learning model. That is, and using the example of FIG. 5, in addition to E2 node load analysis rApp 502 sending KPI analysis rApp 504 an adjusted subscription recommendation, it can also send a ML model recommendation.

In some examples, operation 1208 comprises validating that an incomplete flag for the key performance indicator is unset by a network node of the group of network nodes that corresponds to the key performance indicator before communicating the key performance indicator to the application. This can be performed by a KPI analysis rApp.

After operation 1208, process flow 1200 moves to 1210, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of SMO 114 and/or controller (near-real time RIC) 104.

In some examples, computing environment 1300 can implement one or more embodiments of the process flows of FIGS. 10-12 to facilitate dynamic KPI reporting in an O-RAN.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 (containing disk 1322) can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a near real-time radio access network intelligent controller, wherein the near real-time radio access network intelligent controller comprises at least one hardware processor and an application; and
a service management and orchestration platform,
    wherein the service management and orchestration platform is configured to analyze respective loads on respective network nodes of a group of network nodes that is part of a radio access network, to produce an analysis,
    wherein the service management and orchestration platform is configured to determine, based on the analysis, a first key performance indicator that corresponds to a subscription by the application,
    wherein the service management and orchestration platform is configured to communicate the first key performance indicator to the application, and
    wherein the service management and orchestration platform is configured to, based on determining that a network node of the group of network nodes has failed to report the first key performance indicator, identify a second key performance indicator, wherein the service management and orchestration platform is configured to communicate the second key performance indicator to the application, and wherein the application is configured to adjust a subscription from the first key performance indicator to the second key performance indicator.

2. The system of claim 1, wherein the respective network nodes of the group of network nodes comprise E2 nodes.

3. The system of claim 1, wherein the application comprises an extensible application.

4. The system of claim 1, wherein the service management and orchestration platform comprises a radio access network application that operates in a non real-time radio access network intelligent controller, and wherein the radio access network application is configured to perform the analyzing, the determining, and the communicating.

5. The system of claim 1, wherein the service management and orchestration platform is configured to manage configuration and automation of elements of the radio access network and a radio access network intelligent controller of the system.

6. The system of claim 1, wherein the application is an extended application, and wherein the service management and orchestration platform is configured to onboard a radio access network application or the extended application onto radio access network intelligent controller components of the system.

7. The system of claim 1, wherein the analysis is a first analysis, wherein the first key performance indicator is a first group of key performance indicators, wherein the service management and orchestration platform is configured to analyze indication data reported by the near real-time radio access network intelligent controller, to produce a second analysis that identifies a missing key performance indicator, wherein the service management and orchestration platform is configured to determine, based on the second analysis, to remove the missing key performance indicator from the first group of key performance indicators, to produce a second group of key performance indicators, and wherein communicating the first key performance indicator to the application comprises the service management and orchestration platform communicating the second group of key performance indicators to the application.

8. The system of claim 7, wherein the service management and orchestration platform comprises a radio access network application that operates in a non real-time radio access network intelligent controller, and wherein the radio access network application is configured to perform the analyzing of the indication data, the determining of the second group of key performance indicators, and the communicating of the second group of key performance indicators.

9. The system of claim 7, wherein the service management and orchestration platform comprises a first radio access network application that operates in a non real-time radio access network intelligent controller, wherein the first radio access network application is configured to perform the analyzing of the respective loads, and the determining of the first group of key performance indicators, and wherein the service management and orchestration platform comprises a second radio access network application that operates in the non real-time radio access network intelligent controller, and wherein the second radio access network application is configured to perform the analyzing of the indication data, the determining of the second group of key performance indicators, and the communicating of the second group of key performance indicators.

10. The system of claim 1, further comprising:

a database used for storage by the near real-time radio access network intelligent controller, wherein the database is configured to store key performance indicators that are collected from the group of network nodes.

11. The system of claim 1, further comprising:

a database used for storage by the near real-time radio access network intelligent controller, wherein the database is configured to store subscription details from the application, and wherein the subscription details comprise a first indication of a requested key performance indicator, and a second indication of whether a request for the requested key performance indicator was accepted or failed.

12. A method, comprising:

analyzing, by a service management and orchestration platform of a system that comprises at least one processor, respective loads on respective network nodes of a group of network nodes of a radio access network of the system, to produce an analysis;

determining, based on the analysis and by the service management and orchestration platform, a first key performance indicator for use by an application that operates in a near real-time radio access network intelligent controller of the system;

communicating, by the service management and orchestration platform, the first key performance indicator to the application, wherein the application is configured to subscribe to the key performance indicator;

based on determining that a network node of the group of network nodes has failed to report the first key performance indicator, identifying, by the service management and orchestration platform, a second key performance indicator; and communicating, by the service management and orchestration platform, the second key performance indicator to the application, wherein the application is configured to adjust a subscription from the first key performance indicator to the second key performance indicator.

13. The method of claim 12, wherein the respective loads on the respective network nodes comprises respective loads of processing resources, or respective loads of memory resources.

14. The method of claim 12, further comprising:

performing, by the service management and orchestration platform, iterations of the analyzing.

15. The method of claim 12, wherein the analyzing is performed with a machine learning model that operates on the service management and orchestration platform.

16. The method of claim 12, wherein the adjusting of the subscription from the first key performance indicator to the second key performance indicator reduces a total number of subscribed-to key performance indicators of the system.

17. A non-transitory computer-readable medium comprising instructions that, in response to execution, cause a system comprising at least one processor to perform operations, comprising:

analyzing respective loads on respective network nodes of a group of network nodes of a radio access network, to produce an analysis;

determining, based on the analysis, a first key performance indicator;

communicating the first key performance indicator to an application that is configured to subscribe to the first key performance indicator;

based on determining that a network node of the group of network nodes has failed to report the first key performance indicator, identifying a second key performance indicator; and communicating the second key performance indicator to the application, wherein the application is configured to adjust a subscription from the first key performance indicator to the second key performance indicator.

18. The non-transitory computer-readable medium of claim 17, wherein the operations further comprise:

determining, based on the analysis, and a machine learning model that is trained on the first key performance indicator; and communicating the machine learning model to the application, wherein the application is configured to utilize the machine learning model.

19. The non-transitory computer-readable medium of claim 17, wherein the operations further comprise:

validating that an incomplete flag for the first key performance indicator is unset by a network node of the group of network nodes that corresponds to the first key performance indicator before communicating the first key performance indicator to the application.

20. The non-transitory computer-readable medium of claim 17, wherein the analysis is a first analysis, wherein the first key performance indicator is a first group of key performance indicators, wherein the system is configured to analyze indication data reported by the near real-time radio access network intelligent controller, to produce a second analysis that identifies a missing key performance indicator, wherein the system is configured to determine, based on the second analysis, to remove the missing key performance indicator from the first group of key performance indicators, to produce a second group of key performance indicators, and wherein communicating the first key performance indicator to the application comprises the system communicating the second group of key performance indicators to the application.

\* \* \* \* \*